July 17, 1928.
A. W. POPE, JR
1,677,460
VALVE MECHANISM
Filed July 21, 1926
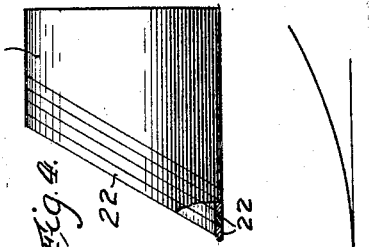
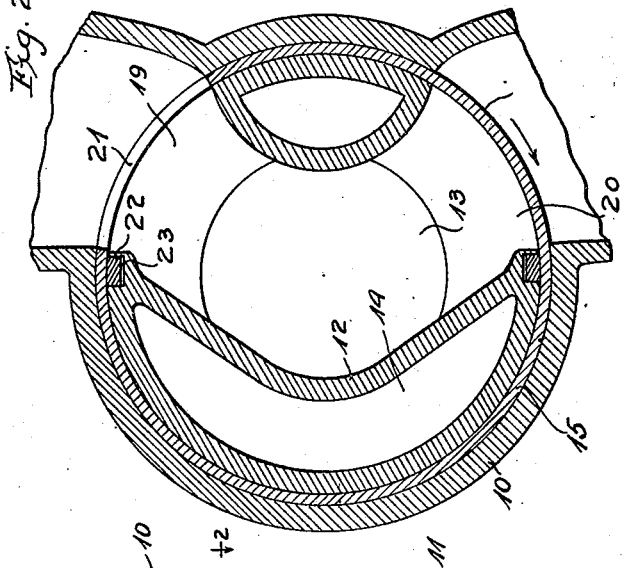
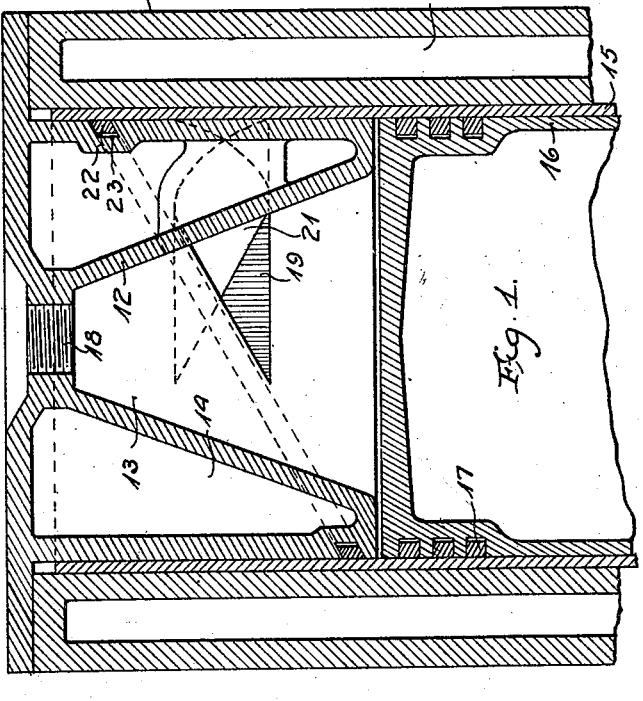
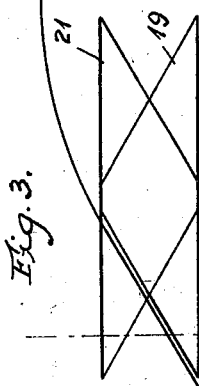
Inventor,
Arthur W. Pope Jr.
By Brown, Boettcher, Dienner
Attys.

Patented July 17, 1928.

1,677,460

UNITED STATES PATENT OFFICE.

ARTHUR W. POPE, JR., OF WAUKESHA, WISCONSIN, ASSIGNOR TO WAUKESHA MOTOR CO., OF WAUKESHA, WISCONSIN, A CORPORATION OF WISCONSIN.

VALVE MECHANISM.

Application filed July 21, 1926. Serial No. 123,968.

My invention relates to valve mechanism, particularly to sleeve valve mechanism for internal combustion engines, and the object of the invention is to provide more practical means for sealing the joint between the valve sleeve and the cylinder against gas leakage during the compression and firing strokes.

In order to effect sealing against the escape of gases during the compression or firing strokes packing strips or rings have been used with the rotary valve, but such strips or rings have been in such shape and form that practical and simple manufacture thereof is almost impossible.

In accordance with my invention, I utilize elliptical packing strips or rings which can be practically and inexpensively produced by obliquely cutting or slicing a hollow cylinder or tubing. Such cutting or slicing can be readily accomplished with simple machinery. These sealing rings are then applied in the engine frame in a plane at an angle to the cylinder axis and with the outer cylindrical surface of the ring exposed to the inner side of the valve sleeve. The various ports are shaped and proportioned to cooperate with the ring to effect the proper sealing during the compression and firing strokes.

On the drawing;

Fig. 1 is a vertical diametrical section of the upper part of a cylinder structure;

Fig. 2 is a sectional view on plane 2—2 of Fig. 1;

Fig. 3 is a diagrammatic developed view showing the relation and cooperation of the various ports; and Fig. 4 shows the manner of cutting the sealing rings from tubing.

The cylinder frame 10 is surrounded by the water jacket 11, and has secured in its upper end the head frame 12 which forms the combustion chamber 13 surrounded by the water space 14. The sleeve valve 15 is interposed between the head frame and the cylinder wall and in its lower end the piston 16 reciprocates, the piston at its upper end being surrounded by the packing ring 17. The head frame has in its top, the axial threaded opening 18 for the insertion of a spark plug (not shown).

The sleeve valve is rotated during operation of the engine, and as rotary valve engines are well known in the art the means for rotating the valve has been omitted from the drawing. The sleeve has the port 19 which cooperates consecutively with the intake port 20 and the exhaust port 21, said intake and exhaust ports being in the head frame 12 and together take up about 180° of the circumference of the head frame, the frame at the other 180° of its wall being closed to the valve port, the compression and firing strokes of the engine taking place during travel of the valve port through this arc of its travels. During the compression strokes and the firing strokes the combustion chamber is under considerable pressure and the gases unless restrained will leak out through the valve port and between the valve wall and the cylinder frame walls. To reduce or eliminate such leakage, a piston ring structure has been interposed between the cylinder head and the valve sleeve and positioned so that during the compression and firing strokes the valve port will be above the sleeve packing or sealing ring and thus sealed or isolated from the combustion chamber. The only escape for the gases then would be either past the piston sealing ring or the valve sealing ring. The valve sealing ring structures heretofore used have been of a form and shape which is impractical and expensive from a manufacturing standpoint. Instead of using a sinuous, helical, or other impractical shape, I use a packing ring 22 of elliptical shape. As shown in Fig. 4 such rings are readily produced by cutting or slicing a tube A obliquely, such slicing or cutting being readily performed by means of saws or other simple tools or machinery.

As best shown in Fig. 1 the packing ring is retained within a groove 23 in the cylinder head and lies in a plane at an angle with the cylinder axis and with its outer cylindrical surface in engagement with the inner surface of the valve sleeve. In the arrangement shown, the plane of the ring is at an angle of less than 90° to the cylinder axis. The various ports are made of a shape to cooperate efficiently with this form of sealing ring.

In Fig. 3 I have shown the ring developed and the relative position of the ports corresponding to the positions shown in Figs. 1 and 2. The intake and exhaust ports are below the upper 180 degree section of the sealing ring and the sleeve valve is carrying its port 21 across the exhaust port, the sleeve valve rotating in the direction of the arrow shown in Fig. 2. As the sleeve rotates, its port will come into registration with the intake port 20 and the valve port will then be carried into the space which is above the lower 180 degree section of the sealing ring and it will remain in this space during the compression and firing strokes of the engine so as to be sealed from the combustion chamber. After the firing strokes the valve port enters the upper 180 degree stretch of the sealing ring to first register with the exhaust port and then with the intake port.

As before stated, the sealing ring being uniplanar, it can be readily manufactured accurately. It is evident that my improved ring, like the ordinary pressure packing ring, can be made of one piece, or of lamination or segments.

Having described my invention, I claim the following:

1. In an engine, the combination of a cylinder having a combustion chamber, a rotary valve having a port adapted to communicate with said combustion chamber during the intake and exhaust strokes of the engine, and a uniplanar sealing ring engaging said valve, the plane of said ring being at an angle with the cylinder axis and the ring being positioned to pass entirely below the valve port and to seal the valve port from the combustion chamber during the compression and firing strokes.

2. In an explosion engine, the combination of a cylinder having a combustion chamber, a sleeve valve between said cylinder and chamber, said valve having a port, and a uniplanar elliptical sealing ring between the combustion chamber and valve and positioned with its plane at an angle of less than 90 degrees with the axis of the cylinder, whereby said port will pass entirely from one side of the ring to the other as the sleeve is rotated.

3. In combination, a cylinder, a cylinder head forming a combustion chamber, a valve sleeve between said head and cylinder walls, said valve having a port, intake and exhaust ports whose connection with the combustion chamber is controlled by said valve port, and a uniplanar sealing ring between said head and sleeve and positioned with its plane at an angle with the cylinder axis, said ring being disposed below said valve port to seal said port from said combustion chamber during compression and firing strokes of the cylinder piston.

In witness whereof, I hereunto subscribe my name this 15 day of July, 1926.

ARTHUR W. POPE, Jr.